United States Patent
Cortadella et al.

(10) Patent No.: US 8,446,224 B2
(45) Date of Patent: May 21, 2013

(54) NETWORK OF TIGHTLY COUPLED PERFORMANCE MONITORS FOR DETERMINING THE MAXIMUM FREQUENCY OF OPERATION OF A SEMICONDUCTOR IC

(75) Inventors: Jordi Cortadella, Gelida (ES); Luciano Lavagno, Turin (IT); Emre Tuncer, Santa Cruz, CA (US)

(73) Assignee: eSilicon Corporation, Sunnyvale, CA (US)

( * ) Notice: Subject to any disclaimer, the term of this patent is extended or adjusted under 35 U.S.C. 154(b) by 36 days.

(21) Appl. No.: 13/181,362

(22) Filed: Jul. 12, 2011

(65) Prior Publication Data

US 2012/0013408 A1    Jan. 19, 2012

Related U.S. Application Data

(60) Provisional application No. 61/363,593, filed on Jul. 12, 2010.

(51) Int. Cl.
*H03L 7/24* (2006.01)
*G06F 17/50* (2006.01)

(52) U.S. Cl.
USPC ............ 331/55; 331/57; 331/172; 703/14; 703/15; 716/113

(58) Field of Classification Search
USPC  331/46–50, 55, 56, 57, 172–174; 703/13–16; 716/113
See application file for complete search history.

(56) References Cited

U.S. PATENT DOCUMENTS

| | | | | |
|---|---|---|---|---|
| 6,137,369 | A * | 10/2000 | Kermani | 331/45 |
| 8,120,410 | B2 * | 2/2012 | Meijer et al. | 327/534 |
| 8,212,622 | B2 * | 7/2012 | Fujiwara et al. | 331/57 |
| 2010/0199234 | A1 * | 8/2010 | Adya et al. | 716/2 |
| 2012/0010837 | A1 * | 1/2012 | Habitz et al. | 702/79 |

FOREIGN PATENT DOCUMENTS

WO    WO 2005/125012    * 12/2005

* cited by examiner

*Primary Examiner* — Levi Gannon
(74) *Attorney, Agent, or Firm* — Stattler-Suh PC

(57) ABSTRACT

A circuit interconnection structure for synchronizing a network of oscillators placed on a semiconductor substrate. One such structure comprises a first synchronizing circuit electrically coupled to a second synchronizing circuit through tunable delay circuits. Also disclosed are methods to tune oscillators placed in different regions of a circuit having multiple clock domains by estimating the relative slack of a first group of signals within the circuit with regard to the period of a first clock domain, and estimating the relative slack of the second group of signals within the circuit with regard to the period of second clock domain, wherein the estimating is performed at process and operational corners that cover the variability of the circuit at different speed conditions, then calculating tuning values for the oscillator delays for each region such that the oscillator delay slack matches the worst relative slack of the signals of the same region.

17 Claims, 14 Drawing Sheets

NETWORK OF TIGHTLY COUPLED PERFORMANCE MONITORS FOR DETERMINING THE MAXIMUM FREQUENCY OF OPERATION OF A SEMICONDUCTOR IC

RELATED APPLICATION

This application claims the benefit of U.S. Provisional Application No. 61/363,593 filed on Jul. 12, 2010 and entitled "A NETWORK OF TIGHTLY COUPLED PERFORMANCE MONITORS FOR DETERMINING THE MAXIMUM FREQUENCY OF OPERATION OF A SEMICONDUCTOR IC".

FIELD

This disclosure applies to the domain of semiconductor integrated circuits, particularly to techniques for determining the maximum frequency of operation of an integrated circuit.

BACKGROUND

Integrated circuits are manufactured with a very high precision process, but their extremely small features still result in a wide range of variability of their runtime characteristics. For example, performance is often measured in terms of maximum achievable clock frequency, and power consumption, often heavily depends on the same parameters of those extremely small features that can ultimately determine performance.

Designers normally handle this variability by assuming at design time that the circuit works under worst-case conditions, i.e. that it delivers its required performance and consumes no more than its maximum power when its process, voltage, temperature and aging conditions are at their worst value. Methods to reduce that pessimism at design time, i.e. statistical static timing analysis, only consider the combinations of those conditions that never, or almost never, occur in practice.

Testing practices may be employed to identify specific integrated circuits that are shown (e.g. via testing) to operate within some band of variability. Of course, such testing techniques generally measure the performance of the critical paths only at testing time, and thus serve only to identify variability in the manufacturing processes, and then only under the specific voltage and environmental conditions present during the testing procedures. However, there is a need to continuously determine the maximum frequency of operation of a semiconductor IC. Such a need applies at post-manufacturing testing time, and/or periodically to estimate its aging, and/or continuously during ongoing operation of the semiconductor IC. Further, there is a need to measure the actual performance of the circuit while 'in the field' in order to manage performance and/or power dissipation while the semiconductor IC is in the field under fluctuating voltage and environmental conditions.

These and other reasons motivate the advances as disclosed herein.

DETAILED DESCRIPTION

Figure 1:
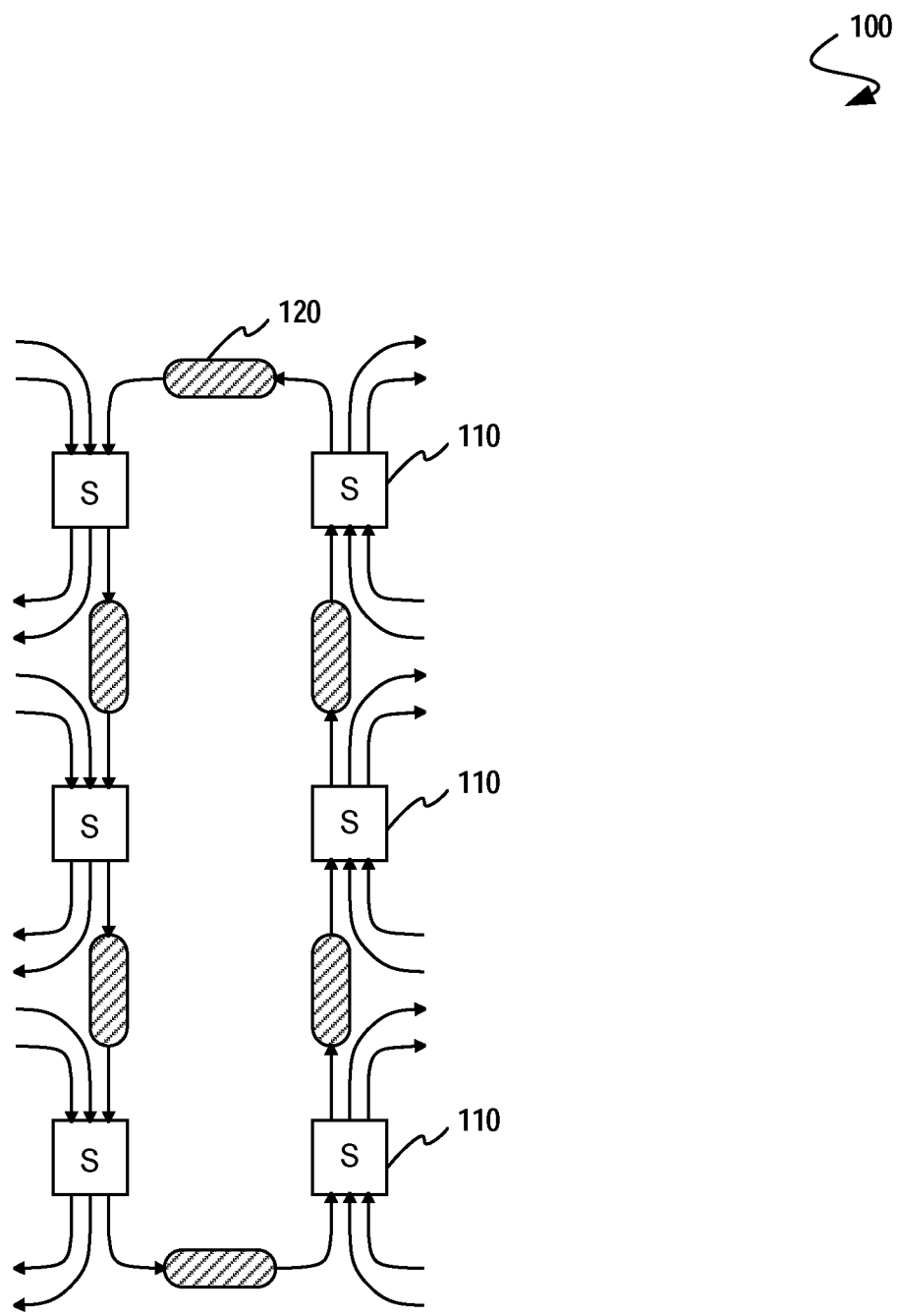
FIG. 1 depicts a tightly connected ring oscillator structure for implementing performance monitors, according to some embodiments.

Integrated circuits are manufactured with a very high precision process, but their extremely small features still result in a wide range of variability in certain operational characteristics, namely, performance and power consumption. Performance is often measured in terms of maximum achievable clock frequency. Power consumption is often related to switching frequency and device 'leakage', both of which depend heavily on the same parameters that determine performance.

Designers normally handle this variability by designing circuits that are shown (e.g. via simulation or in-situ testing) to operate as desired (i.e. perform the desired function) under worst-case conditions. For reliability and other reasons, designers have been forced to design to such worst-case conditions that the system of interest delivers its required performance and consumes no more than its maximum power even when process, voltage, temperature and aging conditions are at their 'worst' value. Methods to reduce that pessimism at design time, i.e. statistical static timing analysis, only consider the combinations of those conditions that never, or almost never, occur in practice. Yet it is this pessimism that is used to calculate margins that correspond to design for worst-case conditions.

For synchronous systems in which the performance is determined by the frequency of the clock signal, the clock period is typically defined according to the delay of the critical paths under the worst-case conditions. However, most of the manufactured systems never work under such pessimistic worst-case conditions and can provide a better performance. Alternatively, this improvement in performance can be transformed into power savings by using voltage scaling techniques that can reduce the power supply voltage without sacrificing performance. One goal of the embodiments is to provide a scheme to measure the actual performance of each manufactured circuit in a way that the clock period or the power supply voltage can be reduced (or some other processor operating condition-dependent performance characteristic can be optimized) without degrading the robustness of the circuit.

To avoid reliance on such worst case design techniques, the actual performance of the circuit must be measured (directly or indirectly) after manufacturing in order to reduce the margins and improve either performance or power and energy consumption. Among possible techniques to do so are:

Indirect Measurement: Process monitors can be used to measure performance indirectly by means of replicas of the critical path at (1) testing time for binning the circuits, or (2) at runtime, e.g. to control the supply voltage.

Direct Measurement: The actual critical paths can be measured at (1) testing time via at-speed testing for binning the circuits, or (2) at runtime via "canary flops" or "razor flops", e.g. to control the supply voltage.

Testing-Time Process Variation

Process variation can be handled by measuring performance at testing time, and either discarding chips that do not meet the required speed (thus impacting yield and hence cost), or sorting them into different bins that are often sold at different prices. This can be done either by using so called "process monitors" (also called "performance monitors"), or by running the circuit at speed.

The process monitors can be either designed as rings of inverters or other gates, connected so as to oscillate, and whose frequency provides an indirect estimate of the performance of the critical path of the circuit. Or, process monitors can be designed as delay lines that emulate some of the critical paths of the circuit.

Of course, effective measurement requires running the circuit 'at speed', and also exercising critical paths. That is, this technique requires loading into registers vectors of values that sensitize the critical paths. For example, at-speed testing requires either the availability of functional vectors (i.e. vectors of register values that can be produced during the normal operation of the circuit), or the use of very time-consuming (and hence costly) scan-based at-speed testing techniques.

Even if such obstacles for measurement are overcome, such process monitors still suffer from aspects of pessimism because the process monitors have a delay that is only correlated with the effects of process variability. That is, such process monitors do not measure exactly the same critical paths that determine the actual maximum operating frequency.

Running-Time Process and Operating Condition Variation

Even application of manufacturing-time testing and binning techniques still does not cover the extensive range of variation that performance and power exhibit at runtime (e.g.

in the field). Thus several methods for measuring performance at runtime have been proposed. They fall into two main categories:

1) Using performance monitors at runtime, or
2) Dynamically detecting synchronization failures that occur when input data to a register changes to close to the clock, which means that the circuit is operating close to or above its current performance limit.

Performance monitors are commonly used to operate the circuit at the minimum voltage that ensures meeting the current performance requirement, thus minimizing both its active and its leakage power consumption. This technique is called adaptive voltage scaling (AVS).

Following the synchronization failure detection techniques, synchronization failures are detected using "canary flops" or "razor flops". The two approaches differ as follows:

Razor flops are critically clocked and are used for driving the datapath logic.

Canary flops are used only for modulating the voltage control circuitry.

Both techniques (i.e. razor flops, canary flops) suffer from the basic problem that critically clocked flip-flops no longer operate as digital devices, hence it is fundamentally impossible to quickly detect in a reliable manner if such a synchronization failure has occurred.

For the razor flops method, the problem is even more serious. Since the values (which may not be digital) at the outputs of these flops are used in the datapath, the circuit must be able to recover from such failures by, for example, using a recovery technique that prevents the circuit from propagating incorrect logic values, and/or by restoring the circuit state to a safe checkpoint (i.e. to a known good state prior to a detected failure). Such recovery techniques often come at unacceptably high costs.

The above methods incur high recovery costs (as mentioned above), and/or use margins in order to make sure that the circuit operates correctly. Moreover, some of the above methods measure the performance of the critical paths indirectly (via performance monitors) or only at testing time, thus leaving the issues of "in the field" performance management unaddressed.

Sample of Desired Characteristics of Approaches

What is needed are techniques, circuits, and methods for overcoming limitations of legacy techniques. Monitor circuits disclosed herein exhibit several desired characteristics:

Extremely low cost (e.g. in terms of silicon area).

Reduction in the degree of pessimism by increasing the number of process monitors.

Effective use of CAD/CAE physical design techniques to ensure they closely track the actual critical path delays.

Overview of Approaches

In exemplary embodiments, additional circuitry is provided to aggregate the measurements from many such monitor circuits to a single "worst actual case" frequency that changes as environmental conditions change, and which can be used for performance management at any point in time after manufacturing. For example, a single "worst actual case" frequency measurement might be used at testing time to bin the integrated circuit. Or, a single "worst actual case" frequency measurement might be used to control supply voltage at runtime (e.g. an improvement to the aforementioned technique of adaptive voltage scaling).

Performance Monitors (e.g. monitor circuits) can be built of gates and wires and can be connected among them using synchronization circuits. Various topologies can be used to connect them: chains, arrays, trees, or other connected topologies. Using the circuits and connectedness as is disclosed herein serves to synchronize all of the connected oscillators on a chip so that they all oscillate at the same frequency—and to match that frequency to the maximum achievable frequency of the logic as manufactured (i.e. with inherent semiconductor process variations) under ambient operating conditions including temperature, voltage, aging, etc.

In some embodiments such connected topologies of performance monitors can thus be used (for example but without limitation) to these specific fields of application:
- As a more precise process monitor for an adaptive voltage scaling (AVS) mechanism, or
- For performance binning at testing time (yet overcoming the aforementioned barriers associated with legacy techniques).

Of course, use of the disclosed connected topologies of performance monitors in a particular application does not necessarily exclude uses in a particular different application. In fact, certain combinations are desirable. For example, the AVS margins can be significantly reduced (as compared to the margin values determined at design time) by measuring at testing time the performance of both the monitors and the critical paths. This would compensate the uncorrelated random variations of performance between them, which would otherwise be covered by a (larger than necessary) margin value. In that case the only margin remaining in the "worst actual case" frequency of operation would be due to the different sensitivity of the monitors and critical paths to operating condition variation and aging.

Optimizing Placement of Multiple Performance Monitors

One effect of using multiple ring oscillators is to minimize the amount of margin to be added to ensure safe operation. By constraining them appropriately (esp. using CAD physical design constraints), a placement method can ensure that they will be placed close to the critical paths to be monitored because variability (both process and operating condition) has a significant correlated component, which ensures that closely placed gates have delays that closely track each other due to both process and operating conditions.

Somewhat more formally, one technique for placing a plurality of performance monitors on a plane of a semiconductor substrate might commence by partitioning the semiconductor substrate into polygonal regions, then selecting vertices of the polygonal regions for placing performance monitors, and then connecting the performance monitors using the earlier-described connections, including connections to/from the tunable delays. The tunable delay elements are tuned such that the period of the oscillators (which may include interconnect media delay in addition to the tuned delay) is the same as (or greater than, with adequate margins) the delay through the critical path of the system circuit.

The topology and interconnections may comprise a chain, or may comprise a mesh, or any other disclosed topology. Moreover, the selecting operation might process CAD data, including CAD placement data, CAD hierarchy data, CAD constraint data, CAD thermal data, CAD voltage drop data, etc.

Figure 9:
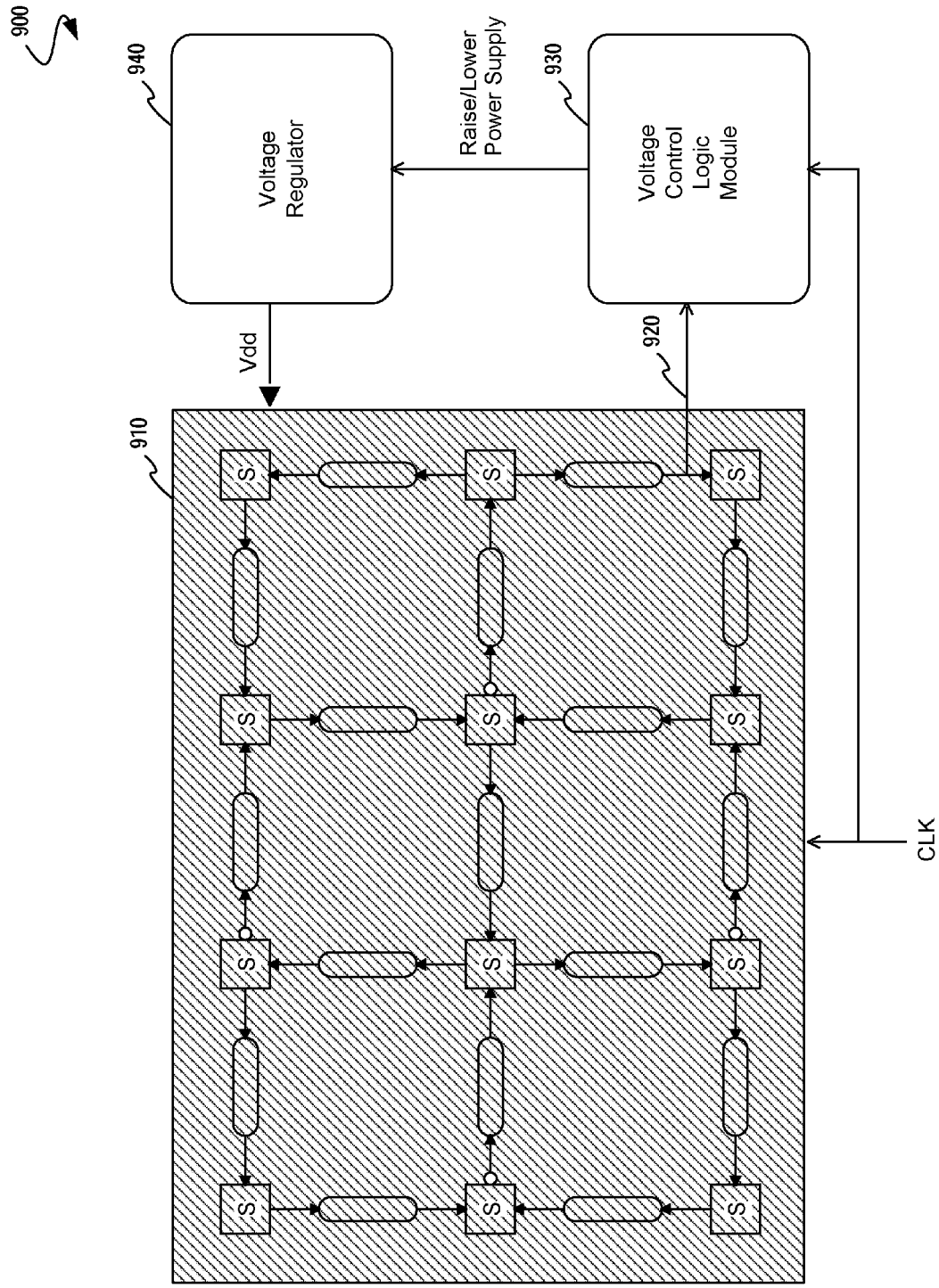
FIG. 9 depicts a network of tightly coupled performance monitors for performing adaptive voltage scaling, according to some embodiments.

One reason to interconnect the ring oscillators is that by providing a single point of access (all node outputs run at the same frequency) one can simplify performance monitoring in, for example:
- Adaptive voltage scaling as shown in FIG. 9, or
- Performance binning by using a single output pin and external frequency measuring device.

Ring Oscillator Structure

FIG. 1 depicts a tightly connected ring oscillator structure for implementing performance monitors. As shown, the rectangles indicated with S are synchronization circuits 110, and the ovals denote delay lines 120 created using a variety of logic gates (e.g. merely an inverter). The topology (alternatives described below), the connectedness (further described below), and the function of the synchronization circuits (also further described below) keep all such ring oscillators running at the same frequency (namely the frequency determined by the slowest among the connected ring oscillators).

More particularly, the tightly connected ring oscillator structure 100 is composed of two main components:
- A set of delay lines D (e.g. delay line 120), whose delay is tuned to closely match that of the critical paths of the system. A delay line includes all delay elements between two consecutive synchronizer circuits.
- A set of synchronizer circuits S (e.g. synchronizer circuit 110), which interconnect those delay lines.

The following description denotes the synchronized ring oscillators as a directed cyclic graph, where the set of nodes S is the set of synchronizer circuits, and the set of arcs D is the set of delay lines.

As shown or inherent, rules of such a graph representation of a circuit interconnection structure using synchronizer circuits and delay lines are:

Rule 1: The delay lines produce an output transition some time after they receive an input transition. They may be inverting (meaning that the output transition is falling if the input is rising and vice-versa) or non-inverting.

Figure 2A:
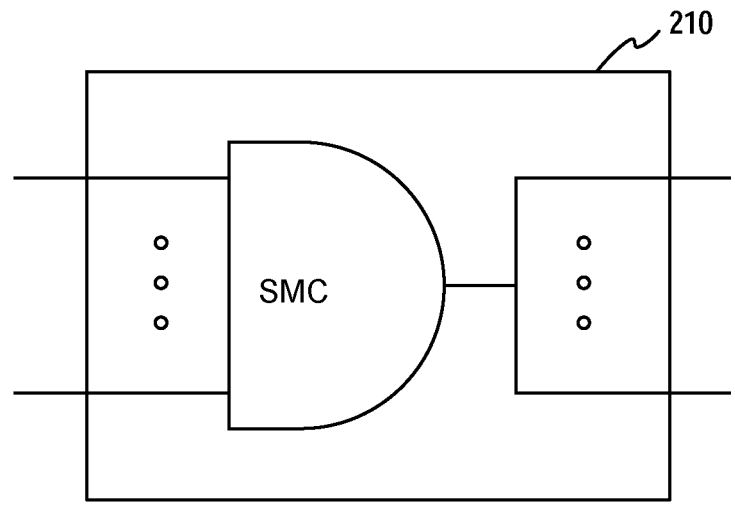
FIG. 2A depicts an implementation of a synchronization circuit using a Muller C-element.
Figure 2B:
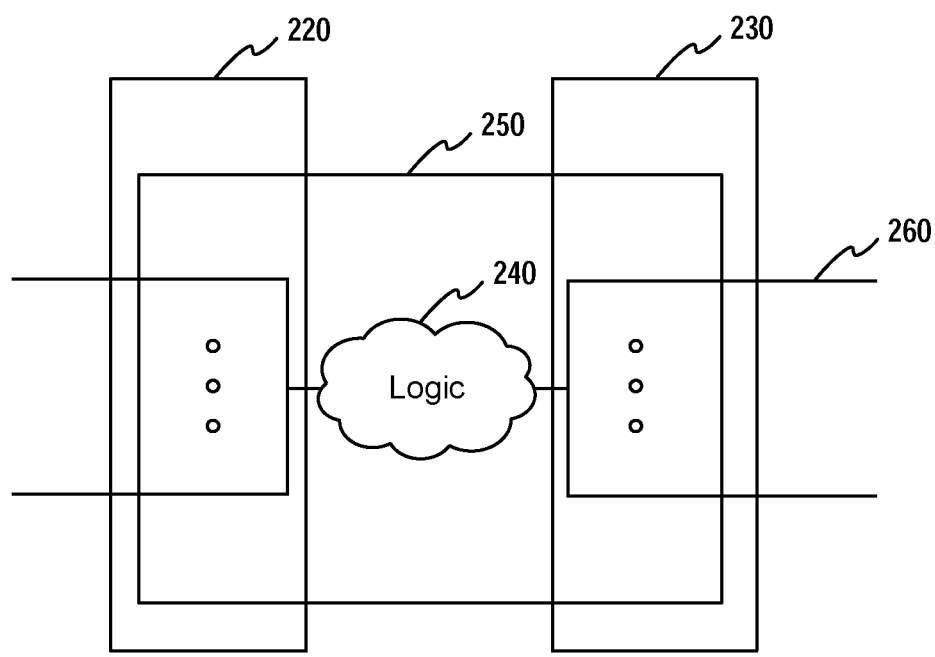
FIG. 2B depicts an implementation of a synchronization circuit using a logic element, according to some embodiments.
Figure 3:
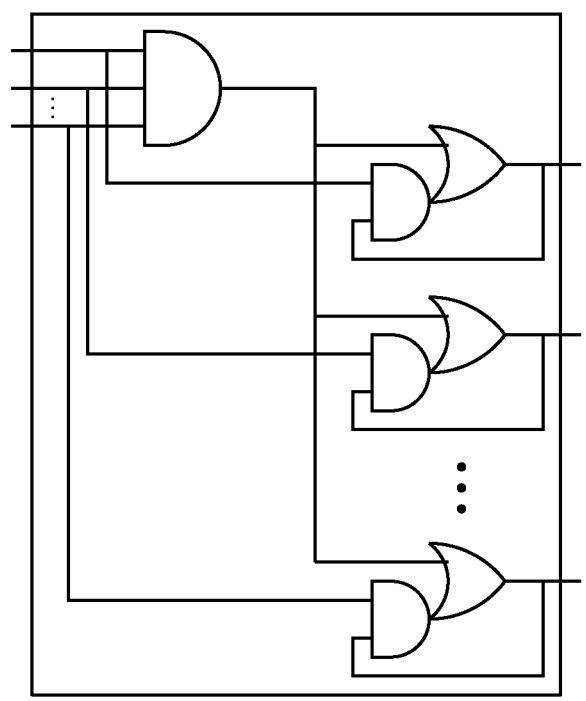
FIG. 3 depicts an alternative implementation of a synchronization circuit where all the oscillators synchronize on only one edge, according to some embodiments.

Rule 2: Synchronization circuits produce a transition at an output only after they have received a transition on every input. Two exemplary schemes are:
  1. The synchronization circuits as illustrated in FIGS. 2A and 2B, respond to falling input transitions (which must all occur before the output transition) with a falling output transition, and to rising input transitions (which must all occur before the output transition) with a rising output transition. In this case, a so-called two-phase operation is achieved in which the distance between any two successive transitions at the output of each node measures the minimum operating period of the logic. This is the sum of the rising and falling propagation delays along the slowest cycle, divided by the number of transitions propagating along that cycle. A similar scheme in which any given mixture of rising and falling input transitions causes a falling output transition, and the opposite mixture of input transitions causes a rising output transition, is also possible. Each synchronization circuit may have an inverting or non-inverting relationship with each one of its inputs.
  2. The synchronization circuits, as illustrated in FIG. 3, wait for a transition in any single direction (one direction per input, in any combination) and then respond with a transition (again in a single direction) on the output. The inputs and outputs can then have the opposite transition in any order and at any time (provided that a minimum pulse width, required for correct detection of the transitions, is respected). This results in a so-called four-phase operation in which the interval between two transitions in the same direction is the measure of the minimum operating period.

Rule 3: The structure of ring oscillators has an initial state determined by a reset signal that forces an initial value in some of the signals of the structure. The other signals stabilize to a value determined by the logic of the circuit. The initial state is stable while the reset signal is asserted. In the initial state, a delay line is said to be active when the value of the output of the delay line is inconsistent with the value of the synchronizing circuit connected at the output of the delay line. Otherwise, the delay line is said to be inactive. Two cases of active delay lines are possible:

The output of the delay line is different from the output of the synchronizing circuit connected to its output and their relationship is non-inverting.

The output of the delay line is equal to the output of the synchronizing circuit connected to its output and their relationship is inverting.

Rule 4: Any cycle in the graph contains at least one active delay line in the initial state. This ensures (from the theory of Marked Graphs) that the structure of oscillators will always oscillate after the reset signal is de-asserted.

Rule 5: Every delay line in the graph is included in one cycle that contains at most one active delay line. This ensures (from the theory of Marked Graphs) that opposite transitions will never "collide" and thus eliminate each other, no matter what the delays are inside the circuit.

Rule 6: The directed graph is strongly connected, i.e. there is a path from any node of the graph to any other node of the graph.

It is then known from the theory of Marked Graphs that all the performance monitors will oscillate with the same period, which is the length of the slowest cycle in the graph divided by the number of transitions propagating along that cycle.

Properties corresponding to Rules 1, 2 and 6 are ensured by the structure of the interconnect. Some exemplary embodiments are shown in FIG. 4 through FIG. 7.

Figure 8A:
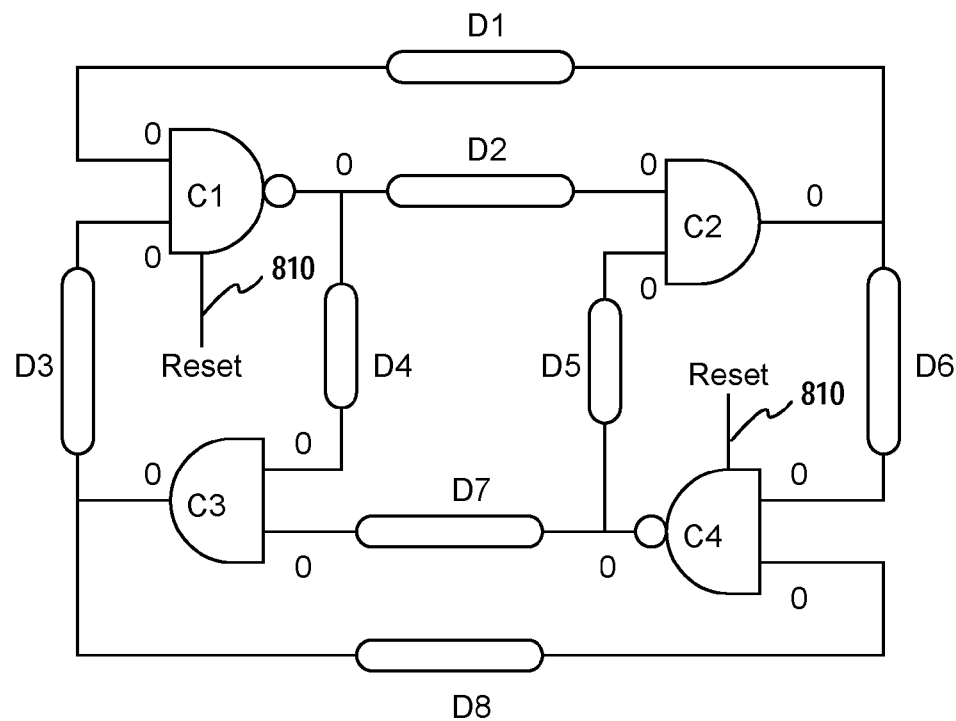
FIG. 8A depicts an interconnection scheme between oscillators with a reset signal to initialize the circuit, according to some embodiments.
Figure 8B:
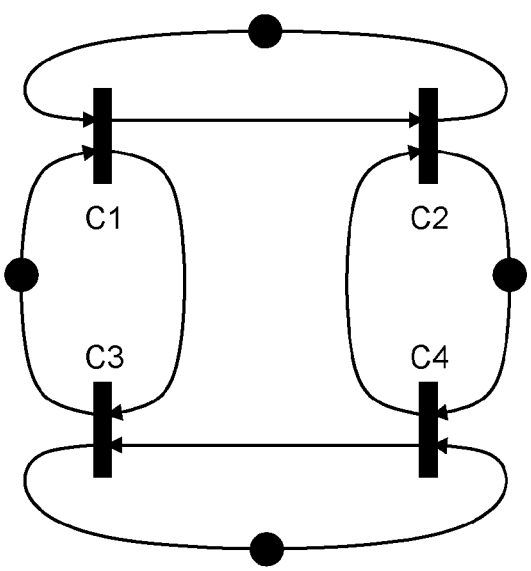
FIG. 8B shows a marked graph that represents the interconnection scheme between oscillators and with an initial marking that represents the initial state, according to some embodiments.

Properties corresponding to Rules 3, 4 and 5 may be ensured by properly resetting the synchronization circuits. An exemplary embodiment of a circuit reset to correctly oscillate is shown in FIG. 8A. FIG. 8B shows the marked graph for representing the behavior of the circuit and the initial marking that represents the initial state.

FIG. 2A depicts an implementation of a synchronization circuit using a Muller C-element. The outputs of the C-element synchronization circuit 210 transitions in a direction (i.e. rising or falling) only after all its inputs transition in the same direction. As described in various embodiments discussed herein, the synchronization circuits respond to falling input transitions (which must all occur before the output transition) with a falling output transition and respond to rising input transitions (which must all occur before the output transition) with a rising output transition.

FIG. 2B depicts an implementation of a synchronization circuit using a logic element. The synchronization circuit 250 comprises an input stage 220, an output stage 230, and a logic element 240. More specifically, the synchronization circuit 250 is an N-input digital signal synchronizing circuit having an input stage 220 capable of accepting a first number of N-input digital signals, and an output stage 230 capable of outputting one or more digital output signals 260. The digital output signal(s) are asserted only when all of the first number of input signals are asserted. Similarly, the digital output signal(s) are deasserted only when all of the first number of input signals are deasserted.

FIG. 3 depicts an alternative implementation of the synchronization circuit where all the oscillators synchronize on only one edge. Such synchronization circuits synchronize on only one edge (in this case, the rising edge).

Topologies of Synchronizing Module Interconnect

Any graph satisfying the rules Rule 1 through Rule 6 above serves for organizing embodiments. The following figures and corresponding descriptions examine some topologies in order to better understand their different characteristics, which may in turn be adapted to the requirements of the intended applications.

Figure 4:
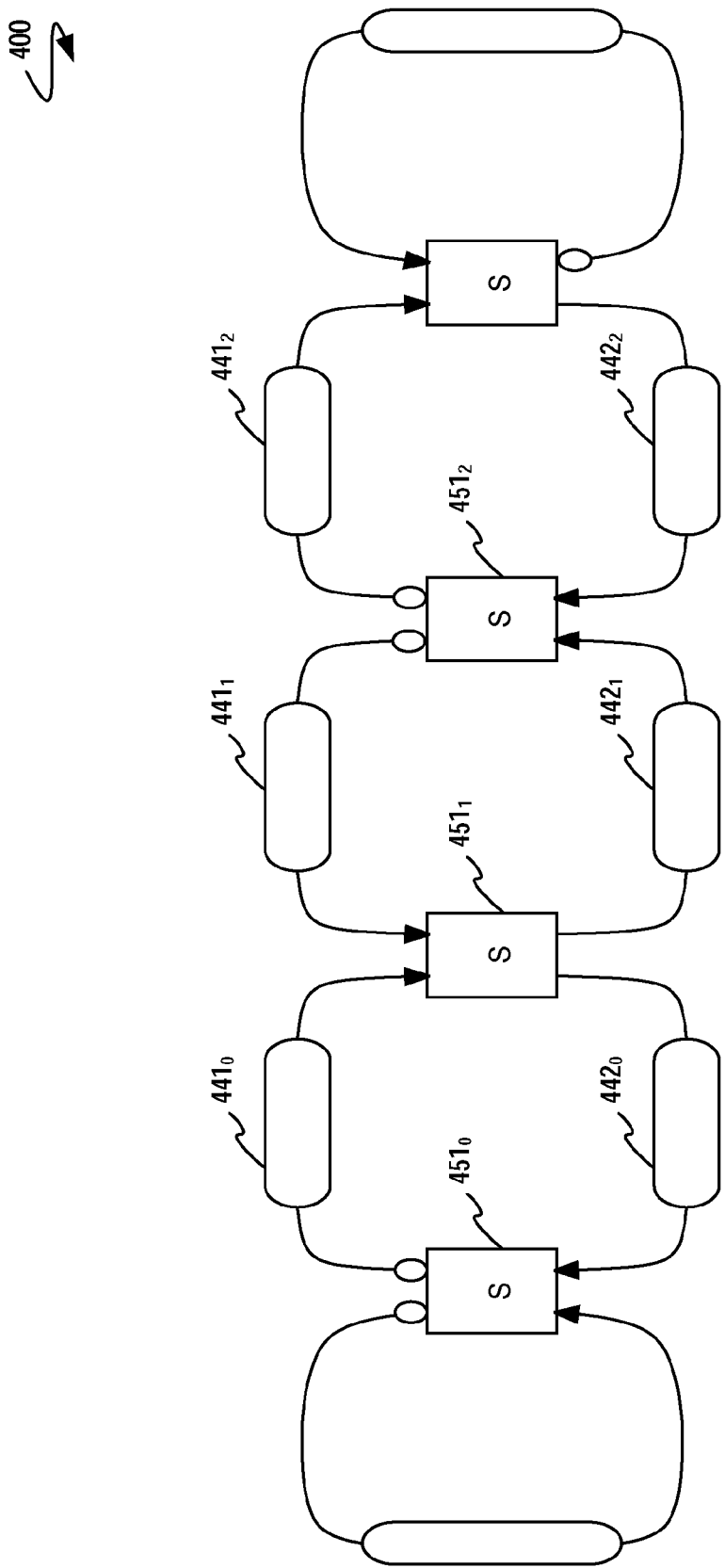
FIG. 4 depicts an interconnection scheme between the oscillators, where the interconnection is organized as a chain interconnection, according to some embodiments.

FIG. 4 depicts an interconnection scheme between the oscillators, where the interconnection is organized as a chain interconnection. The interconnection chain 400 as organized in FIG. 4 is characterized as having relatively small cost (in terms of silicon area consumed), but having a relatively long propagation time of frequency changes from one end to the other (namely the cycle period multiplied by the chain length). A relatively long propagation time may serve in some applications, but may be counter-indicated in other applications. For example, in adaptive voltage scaling applications, the relatively long propagation time may be longer than desired. As shown, the chain is formed as a circuit interconnection structure for synchronizing a network of oscillators placed on a semiconductor substrate whereby a synchronizing circuit (e.g. synchronizing circuit $451_0$) is coupled to a second synchronizing circuit $451_1$. Connections are formed such that a first output of the first synchronizing circuit $451_0$ is coupled to a first input of the second synchronizing circuit $451_1$ through a first tunable delay $441_0$. Also, a first output of the second synchronizing circuit $451_1$ is coupled to a first input of the first synchronizing circuit $451_0$ through a second tunable delay $442_0$. For the oscillators to be initialized according to Rules 4 and 5, it is sufficient to define the value 0 at the outputs of the inverting synchronizing circuits.

Figure 5:
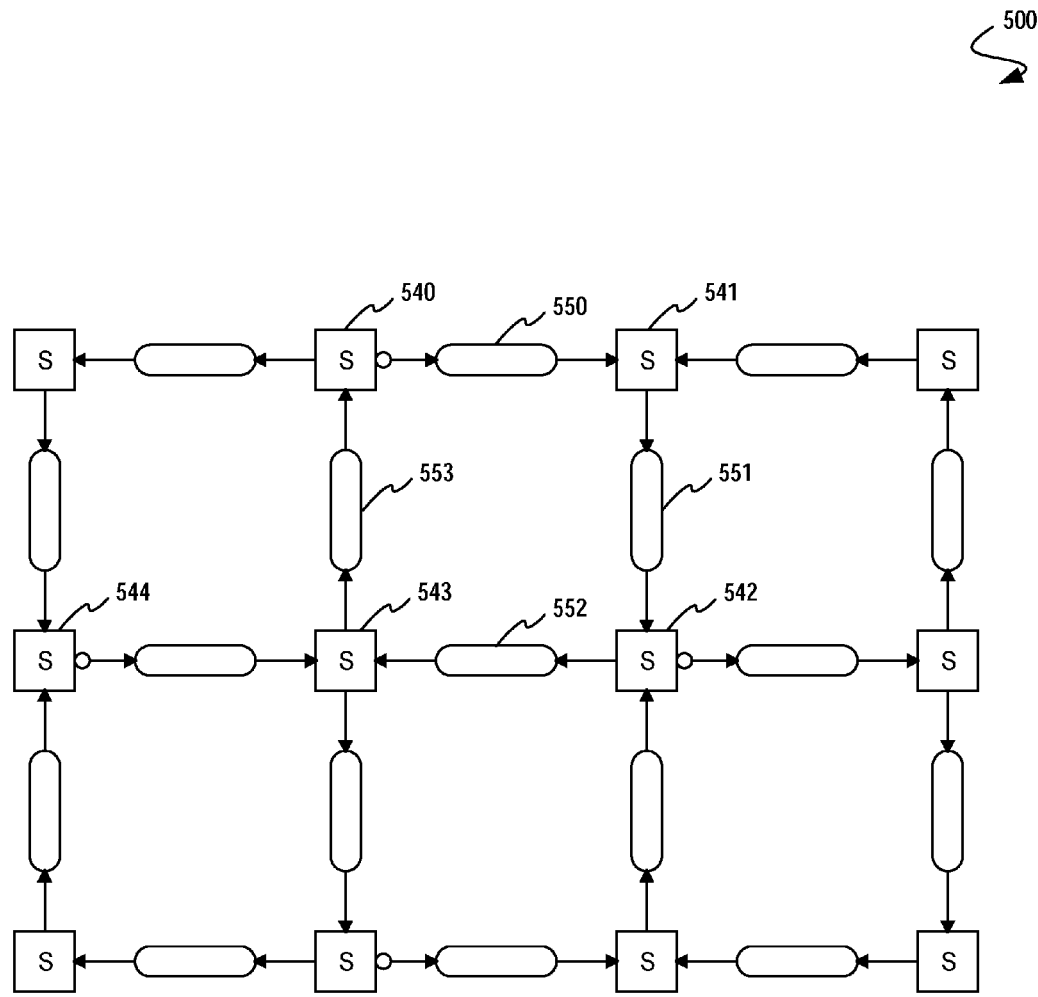
FIG. 5 depicts an interconnection scheme between the oscillators whereby the interconnection is organized as a mesh interconnection, according to some embodiments.

FIG. 5 depicts an interconnection scheme between the oscillators whereby the interconnection is organized as a mesh interconnection. The mesh interconnect of FIG. 5 is stable and has a fast propagation time that is proportional to the size of the chip, but has a high cost (in terms of silicon area consumed). The mesh interconnect 500 that is used as a network of tightly coupled performance monitors for determining the maximum frequency of operation of a semiconductor may be described as: A circuit interconnection structure for synchronizing an array of oscillators comprising a first synchronizing circuit 540 coupled to a first neighbor synchronizing circuit 541, a second neighbor synchronizing circuit 542, and a third neighbor synchronizing circuit 543. Connections are formed in a repeating mesh pattern, where a first output of the first synchronizing circuit is coupled to a first input of the first neighbor synchronizing circuit through a first tunable delay 550, a first output of the first neighbor synchronizing circuit 541 is coupled to a first input of the second neighbor synchronizing circuit 542 through a second tunable delay 551, a first output of the second neighbor synchronizing circuit 542 is coupled to a first input of the third neighbor synchronizing circuit 543 through a third tunable delay 552, and a first output of the third neighbor synchronizing circuit 543 is coupled to a first input of the first synchronizing circuit 540 through a fourth tunable delay 553. A correct initialization of the circuit can be obtained by enforcing a 0 at the inverting output of the synchronizing circuit 542, a 1 at the non-inverting output of the same synchronizing circuit and a 1 at the output of the synchronizing circuit 544.

Figure 6:
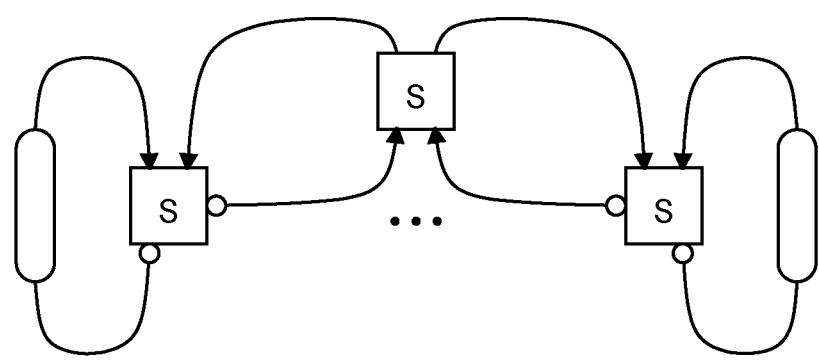
FIG. 6 depicts an interconnection scheme between the oscillators whereby the interconnection is organized as a star interconnection, according to some embodiments.

FIG. 6 depicts an interconnection scheme between the oscillators whereby the interconnection is organized as a star interconnection. The star interconnect of FIG. 6 has a very fast propagation time (only one cycle period) but may be difficult to implement due to the very long wires, which (depending on the technology and physical design) have a high delay and may be difficult to constrain. On the other hand, long wires may be useful in that long wires can serve as delay lines. This situation is quite desirable for circuits in which the critical paths also include long wires, since the long wires serving as delay lines track well with long wires in critical paths (since logic and interconnect have very low correlation, while wires correlate well with wires). The circuit can be initialized by enforcing a 0 at the inverted outputs of the synchronizing circuits. With this initialization, all signals stay at 0 in the initial state. A similar correct initialization can be obtained by enforcing a 1 at all signals.

Figure 7:
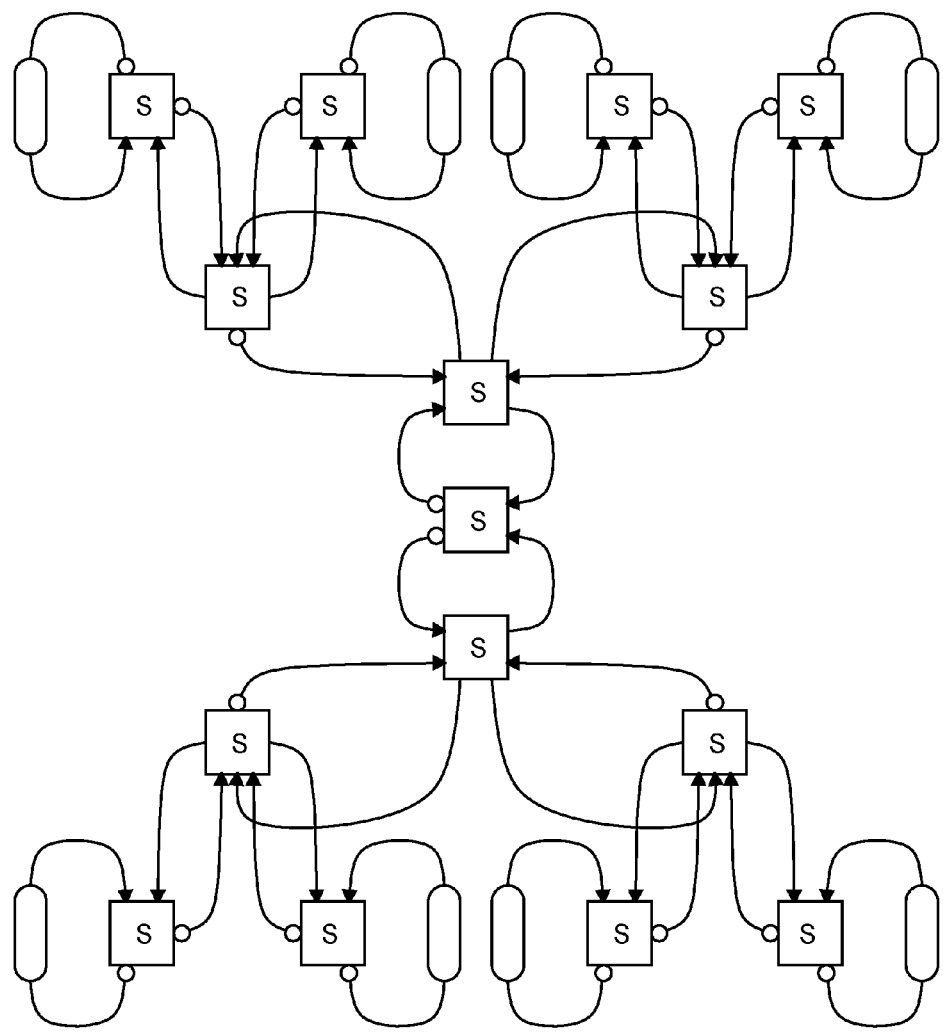
FIG. 7 depicts an interconnection scheme between the oscillators whereby the interconnection is organized as a tree interconnection, according to some embodiments.

FIG. 7 depicts an interconnection scheme between the oscillators whereby the interconnection is organized as a tree interconnection. A correct initial state can be obtained by enforcing a 0 at all the inverted outputs of the synchronizing circuits. A tree interconnect like in FIG. 7 may be a good compromise between the cost of the mesh and the long delays of the star. Of course grids of trees, trees of grids, and many other topologies are possible.

FIG. 8A depicts an interconnection scheme between the oscillators with a reset signal 810 for initializing the circuit. FIG. 8B shows a marked graph corresponding to the initial state of the circuit. The interconnection scheme has four C-elements, as shown, C1, C2, C3, and C4, and eight delay lines, as shown D1, D2, D3, D4, D5, D6, D7, and D8. Following this interconnection scheme, a correct initial state can be enforced by resetting the two inverting C-elements C1 and C4 (e.g. using the reset signal 810).

FIG. 8B shown a marked graph that represents the activity of the circuit shown in FIG. 8A. In the initial state, the delay lines D1, D3, D6 and D8 are active because their output is inconsistent with the output value of the C-elements connected at their output. The arcs representing active delay lines have a token in the corresponding arc of the marked graph. This initialization is correct because it honors Rules 4 and 5.

Methods to Constrain the Delay Lines

As is foreshadowed in the foregoing paragraphs on topologies, the ring oscillators can be physically located at different regions of the circuit. Within each region, the delay lines of the oscillators can be adjusted to match the critical paths in the region. In this way, regions with paths that have a large slack with regard to the cycle period of the circuit would have ring oscillators with shorter delays. This strategy would enable each oscillator to strictly measure the performance at each region. A ring oscillator with a large slack would determine the global frequency of the system of oscillators only if the operating conditions would counterbalance the slack.

It could also be possible to use "logical regions" instead of physical proximity regions by grouping together the signals terminating into a given hierarchical block of the design. This is justified by the fact that modern physical design tools tend to keep gates belonging to a given hierarchical module physically close.

Therefore, by designing the oscillators according to the slack of the region in which they are assigned, the frequency of all of the oscillators would be determined by the global combination of slacks and variability. The frequency of the oscillators would become a measure of the estimated clock period required for a correct operation of the circuit.

Combining a Network of Tightly Coupled Performance Monitors with Adaptive Voltage Scaling Techniques FIG. 9 depicts a network of tightly coupled performance monitors for performing adaptive voltage scaling. A network of tightly coupled performance monitors can be used to provide a distributed performance monitor for use with adaptive voltage scaling techniques. Such techniques change the supply voltage at runtime using a margin to ensure safe operation. The margin can be defined either at design time or (often with more precision), at or after manufacturing of the IC.

Fabricated onto a substrate 900 is a network of tightly coupled performance monitors, namely the 3 by 4 mesh network 910 which, as previously discussed, will equilibrate to the maximum safe operational frequency. Given the frequency of a reference clock CLK, and a measurement of the equilibrated frequency at the measurement tap 920, a voltage control logic module 930 signals a voltage regulator 940 to raise or lower the power supply voltage, thus improving on the technique of adaptive voltage scaling.

Figure 10:
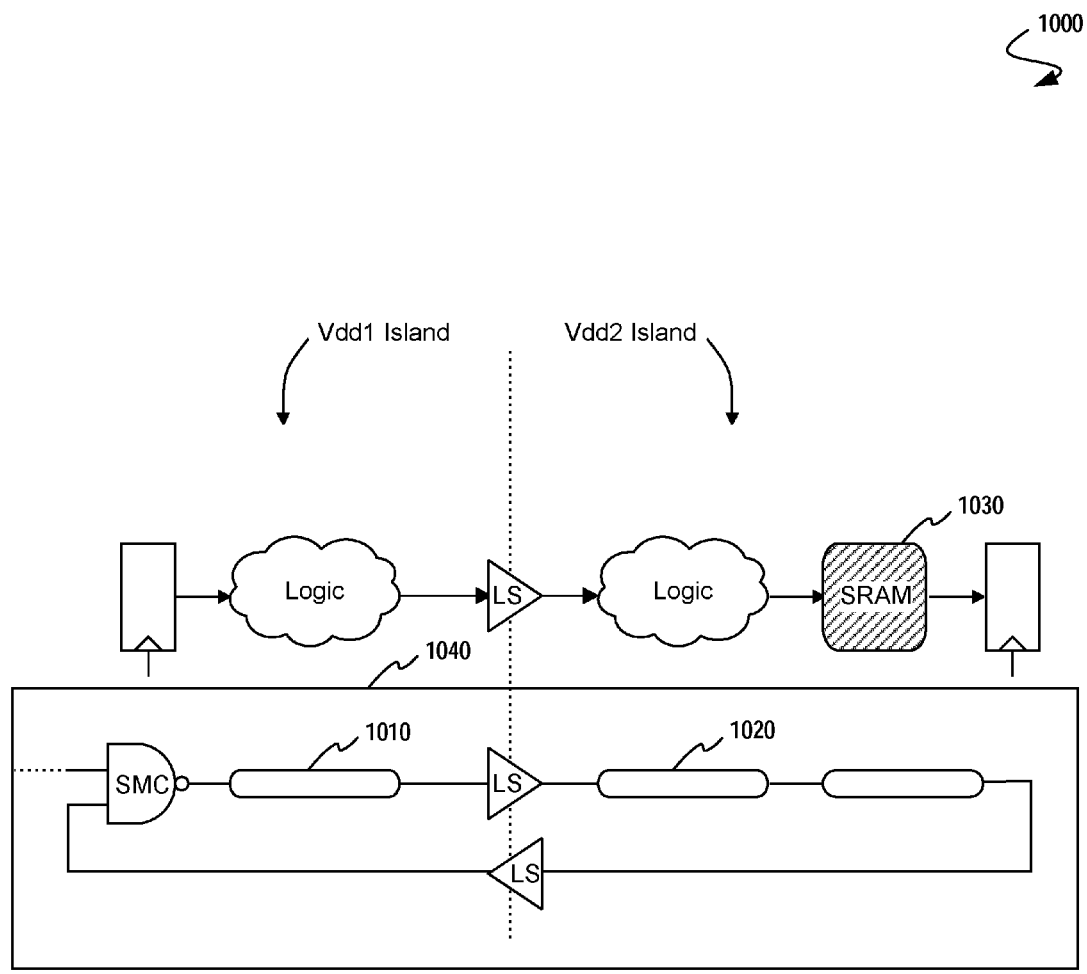
FIG. 10 depicts the insertion of the matched delays in the case of a circuit area comprising several islands with different supply voltages, according to some embodiments.

FIG. 10 depicts the insertion of the matched delays in the case of a circuit area comprising several islands 1000 with different supply voltages (e.g. Vdd1 and Vdd2) in order to accurately match each section. In some cases multiple different supply voltages are used for different sections (which sections are termed "voltage islands"), and thus the paths between the islands are matched by delay lines that also cross the boundary between sections. In certain topologies, each segment of a multi-island critical path must have a corresponding matched delay line segment that is physically situated in the same island, as shown in FIG. 10. More particularly, a matched delay line segment may be comprised of a first voltage delay line 1010 and a second voltage delay line 1020, thus ensuring that oscillator frequencies track the circuit delays under all possible voltage combinations. This is virtually impossible to satisfy at design time due to the enormous number of combinations of voltages and paths that may need to be considered. It is thus better handled directly by the technique shown and described in FIG. 10.

Somewhat more formally, one technique for coupling voltage islands might commence by determining a boundary point between a first voltage island and a second voltage island, then placing a first tuned delay in the first voltage island (where the value of the first tuned delay is selected based on the delay from a first voltage island reference clock to the boundary point), and placing a second tuned delay in the second voltage island (where the value of the second tuned delay is selected based on the delay from the boundary point to a second voltage island reference clock). Once such elements are so placed, completing the circuit is accomplished by connecting the output of the second tuned delay to the input of a synchronizing module, and connecting the output of the synchronizing module to the input of a first tuned delay.

As can now be recognized, environmental changes in one island are measured by the delay element in that island, and environmental changes in the other island are measured by the delay element in that other island.

Still referring to the circuit area comprising several islands 1000, the devices as shown includes a memory (e.g. SRAM 1030). Some embodiments possess delay lines that accurately match the performance variations as exhibited by memories (RAM, ROM, Flash, etc). Although this is merely one embodiment of a device in a voltage island, it is exemplary in that memories are often on the critical path.

Thus, combinational paths in the circuit are distinguished into two classes of cases:

- Those cases with source, gates and sinks within a region of standard cells with the same Vdd and with negligible interconnect delays. For this case, one technique calculates the slack of every sink and designs the delay line to match the smallest slack(s).
- Those cases with memories, voltage shifters, long interconnects, and other non-standard-cell blocks. These cases call for techniques involving delay matching based on paths that mimic the change of timing of the blocks or interconnects along the path. Of course, certain sets of paths (e.g. the sets of paths from address to data in memories or register files) may vary substantially with respect to process and operating conditions.

The delays of the oscillators can also be designed to match some linear relationship with the clock period of the circuit.

For example, the delays of the oscillators could be designed to be twice the required clock period of the circuit. In this case, it is convenient that all oscillators are designed to match a similar linear relation in such a way that the measured frequency is uniformly scaled for all regions.

Combining a Network of Tightly Coupled Performance Monitors with Multiple Clock Domains Operating at Different Frequencies An interconnection of oscillators can also be designed to match the delays of a system with multiple clock domains operating at different frequencies. For example, the delay of each oscillator could be designed to match the most critical signal of all the signals and clock domains in the corresponding bounding region. The delays for oscillators in a bounding region would be defined according to the linear relationship between the ring oscillator and the clock domain with the most critical signal. In this way, the variability of a system with multiple clock domains (e.g. having circuits within multiple bounding regions operating at different frequencies) can also be monitored with a single interconnection of oscillators and a single access point.

Note that a network of ring oscillators has two types of cycles:

Those cycles which include the delay lines that match the critical paths of the circuit.
Those cycles that only ensure the strong connectedness of the circuit and enforce the same frequency on all oscillators.

The latter are not constrained to have a specific minimum delay. However, it is important that they do not become critical, otherwise the delays of the actual matched ring oscillators would be masked by the delays of the interconnect cycles, which do not necessarily track the delays of the critical paths of the circuit.

FIG. 11A through FIG. 11E illustrate possible strategies to define the delay of ring oscillators in a circuit having multiple regions and clock domains. In this example, the area of the circuit is divided in four regions (R1-R4) that correspond to the four quadrants of the area of the circuit. The circuit contains a plurality of sequential elements, and combinational paths spread across the multiple regions. In this case, the sequential elements are connected to two different clocks, CLK1 and CLK2. In this example, the clock periods corresponding to CLK1 and CLK2 are 2 ns and 5 ns, that CLK1 operates at a frequency of 500 MHz and CLK2 operates at a frequency of 200 MHz.

Figure 11A:
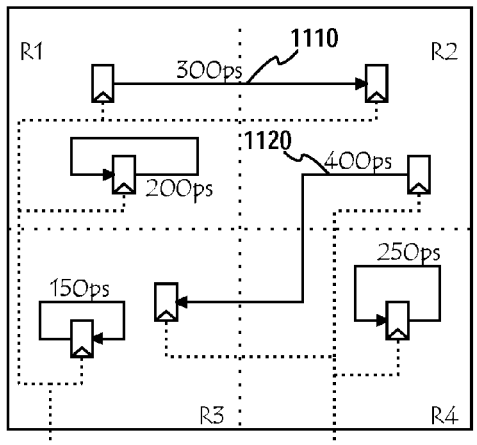
FIGS. 11A through 11E illustrate possible strategies to define the delay of ring oscillators in a circuit having multiple regions and clock domains, according to some embodiments.
Figure 11B:
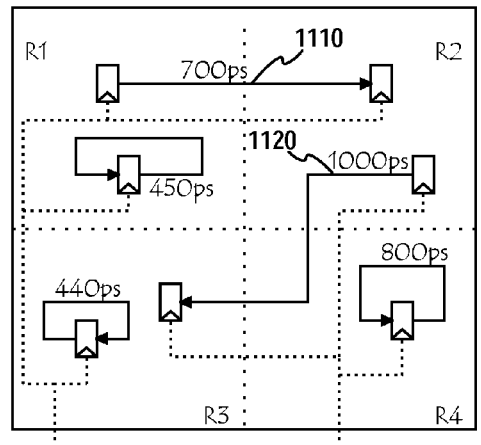

The paths shown as solid lines with single arrowheads in FIG. 11A and FIG. 11B are to the critical paths in the circuit. The numeric time periods annotated in FIGS. 11A and 11B are the slacks of the critical paths with regard to their clocks in two different corners (e.g. worst and best, respectively). For example, the path 1110 going from region R1 to region R2 and with 300 ps of slack has a delay of 1700 ps in the worst-case corner represented in FIG. 11A. The same path has a delay of 1300 ps (slack of 700 ps) in the best-case corner represented in FIG. 11B. Since the paths are critical, the slacks are associated to all signals traversed by the path.

As shown, some paths are spread along several regions. For example, the path 1120 with 400 ps of slack in FIG. 11A traverses regions R2, R4 and R3. Since CLK2 has a period of 5 ns, this path has a delay of 4600 ps (i.e. equal to 5000 ps-400 ps).

Figure 11C:
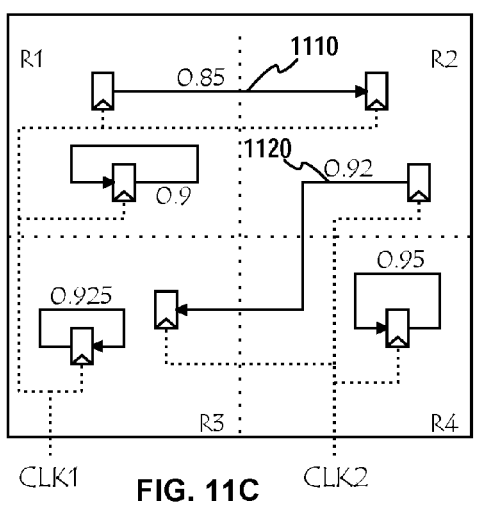
Figure 11D:
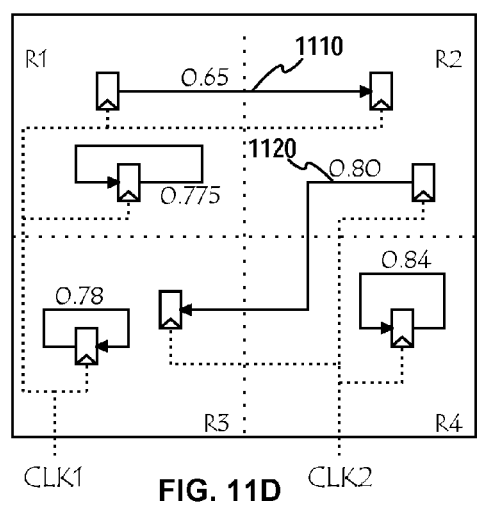

FIG. 11C and FIG. 11D represent the same paths and the same corners. In this case, the paths are annotated with their normalized delays with regard to the clock period of their associated clock domain. For example, FIG. 11C shows the path going from R1 to R2 as annotated with 0.85, which represents the ratio of the clock period taken by the delay of the path (e.g. 0.85=1700 ps/2000 ps).

From the delay analysis obtained from all critical paths in all corners and each region, the desired delay for the ring oscillators at each region can be derived. For that, a common reference frequency is chosen for each oscillator. In this particular case, a period of 10 ns (100 MHz frequency) is chosen. For each region and corner, the signal with worst criticality is chosen as a delay reference. For example, by looking at region R3, one can observe that the most critical path crossing the region has a normalized delay of 0.925 in the first corner and a normalized delay of 0.80 in the second corner. In this case, the critical paths are different at each corner.

Figure 11E:
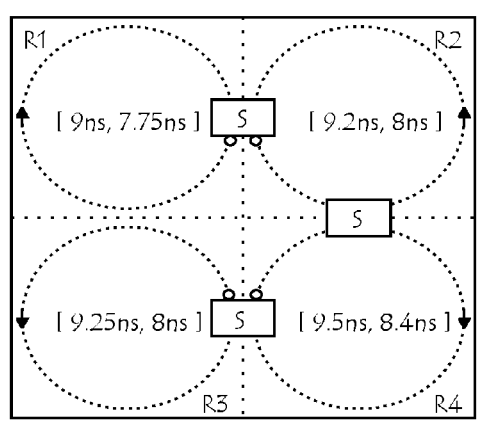

FIG. 11E represents the specifications of the delays of the ring oscillators for each region and each corner. Each oscillator is annotated with two values, one for each corner, obtained by scaling the normalized delays to the chosen period for the oscillators. For example, the delays for region R3 are 9.25 ns and 8 ns, respectively.

The calculated delays are used in the specifications for the ring oscillators. With the appropriate strategy, the delay synthesis tools should produce ring oscillators that have a scaling across the corners as close as possible to the specifications. The margins required for a conservative tracking of the variability will depend on the accuracy in synthesizing the delays of the ring oscillators.

Now, expressing the aforementioned as a method (e.g. a method as may be practiced within an EDA tool), one embodiment is described as: A method to tune the delays of various oscillators placed in different regions of the circuit having multiple clock domains by calculating the relative slack of each signal with regard to the period of its corresponding clock domain at a plurality of corners that cover the variability of the circuit at different speed conditions; calculating, for every corner, the worst relative slack of all signals placed at each region; defining a common target frequency for all the oscillators; and tuning the delay of the oscillators at each region in a way that the slack with regard to the target frequency matches the worst relative slack of the signals of the same region at each corner. In various embodiments, the circuit may be formed using an interconnection in the topology of a chain, a mesh, a tree, a star, or other topology. Any of the aforementioned techniques can be embodied in a computer program product. For example, a computer program product might perform steps for determining the delays of oscillators, each operating in a different region. Or, a computer program product might perform steps for determining the maximum frequency of operation of a system in the presence of two or more voltage islands.

Figure 12:
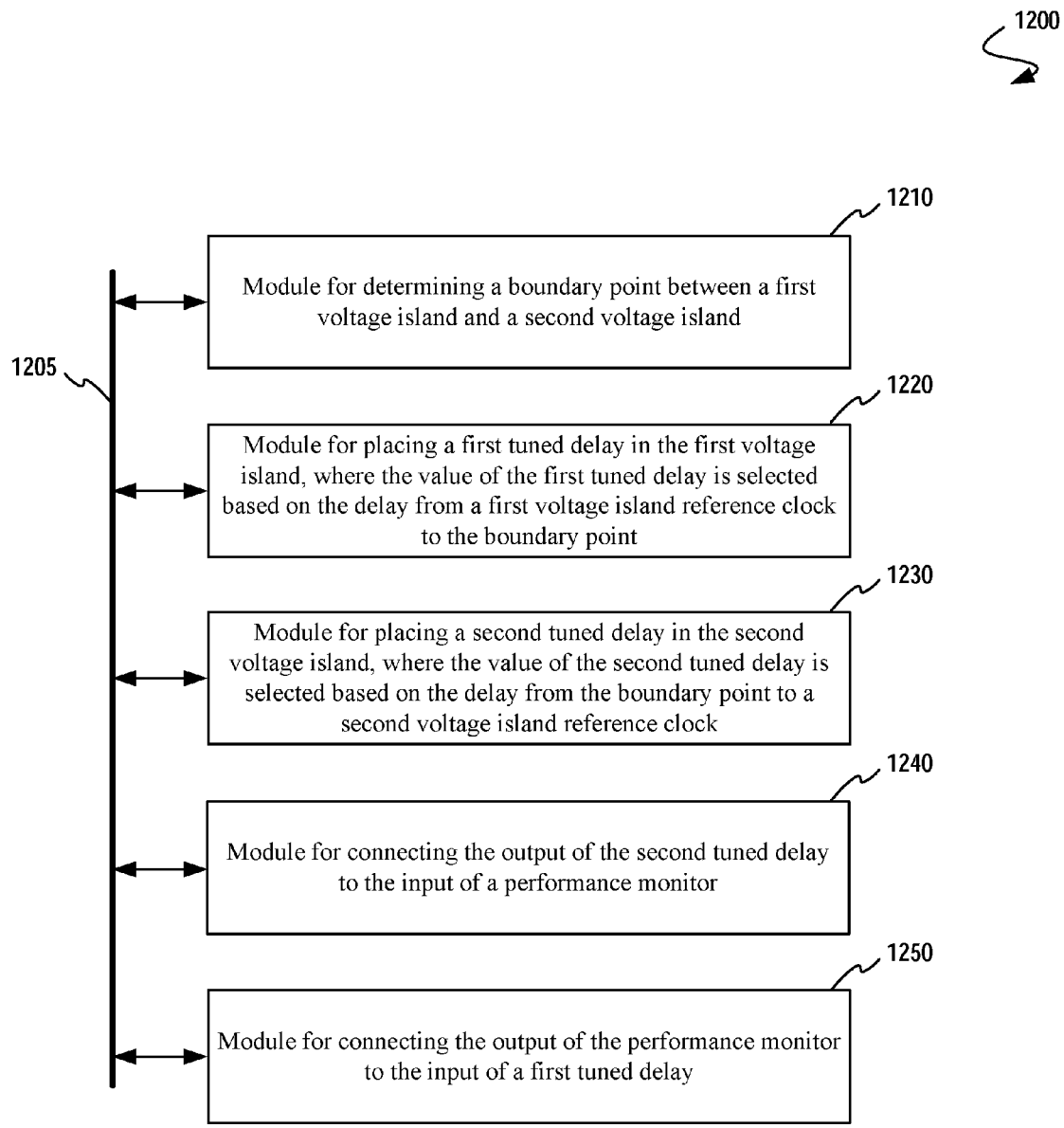
FIG. 12 depicts a block diagram of a computer program product for determining the maximum frequency of operation of a system in the presence of two or more voltage islands, according to some embodiments.

FIG. 12 depicts a block diagram of a computer program product for determining the maximum frequency of operation of a system in the presence of two or more voltage islands, the computer program product comprising modules in communication one with another over a communication channel 1205. The modules are capable of performing operations comprising:

determining a boundary point between a first voltage island and a second voltage island (operation 1210);
placing a first tuned delay in the first voltage island, where the value of the first tuned delay is selected based on the delay from a first voltage island reference clock to the boundary point (operation 1220);
placing a second tuned delay in the second voltage island, where the value of the second tuned delay is selected based on the delay from the boundary point to a second voltage island reference clock (operation 1230);

connecting the output of the second tuned delay to the input of a performance monitor; (operation 1240); and connecting the output of the performance monitor to the input of a first tuned delay (operation 1250).

Figure 13:
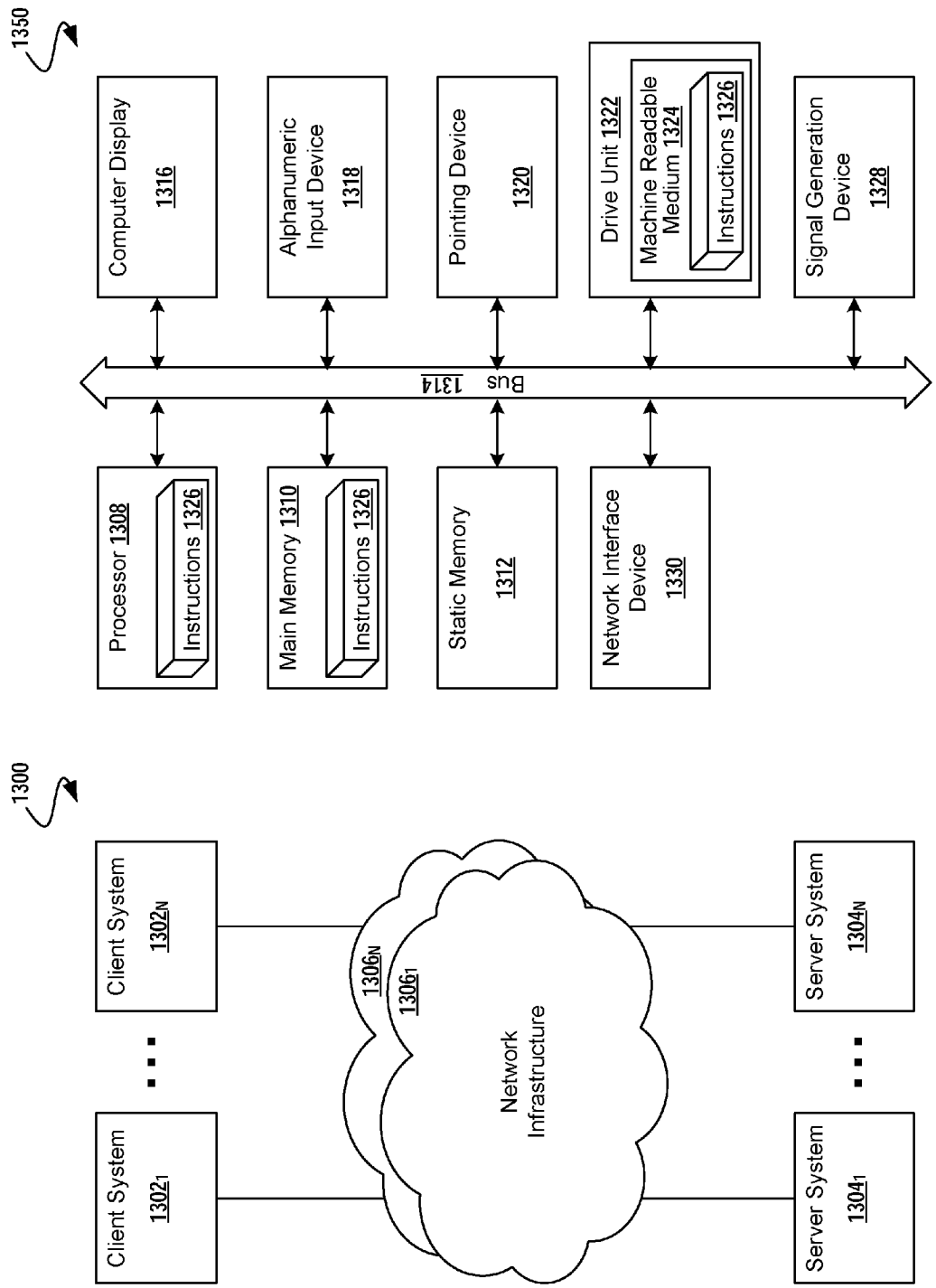
FIG. 13 is a diagrammatic representation of a computing network, according to some embodiments.

FIG. 13 is a diagrammatic representation of a computing network 1300, including nodes for client computer systems 1302₁ through 1302_N, nodes for server computer systems 1304₁ through 1304_N, nodes for computing network infrastructure 1306₁ through 1306_N, any of which nodes may comprise a machine 1350 within which a set of instructions for causing the machine to perform any one of the techniques discussed above may be executed. The embodiment shown is purely exemplary, and might be implemented in the context of one or more of the figures herein.

Any node of the computing network 1300 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a computing network router, a computing network switch, a computing network bridge, a personal digital assistant (PDA), a cellular telephone, a web appliance, or any machine capable of executing a sequence of instructions that specify actions to be taken by that machine. Any node of the computing network may communicate cooperatively with another node on the computing network. In some embodiments, any node of the computing network may communicate cooperatively with every other node of the computing network. Further, any node or group of nodes on the computing network may comprise one or more computer systems (e.g. a client computer system, a server computer system) and/or may comprise one or more embedded computer systems, a massively parallel computer system, and/or a cloud computer system.

The computer system 1350 includes a processor 1308 (e.g. a processor core, a microprocessor, a computing device, etc), a computer memory (e.g. main memory 1310) and/or a static memory 1312), which communicate with each other via a bus 1314. The machine 1350 may further include a display unit 1316 that may comprise a touch-screen, or a liquid crystal display (LCD), or a light emitting diode (LED) display, or a cathode ray tube (CRT). As shown, the computer system 1350 also includes a human input/output (I/O) device 1318 (e.g. a keyboard, an alphanumeric keypad, etc), a pointing device 1320 (e.g. a mouse, a touch screen, etc), a drive unit 1322 (e.g. a disk drive unit, a CD/DVD drive, a tangible computer readable removable media drive, an SSD storage device, etc), a signal generation device 1328 (e.g. a speaker, an audio output, etc), and a computing network interface device 1330 (e.g. an Ethernet interface, a wired computing network interface, a wireless computing network interface, a propagated signal interface, etc).

The drive unit 1322 includes a machine-readable medium 1324 on which is stored a set of instructions (i.e. software, firmware, middleware, etc) 1326 embodying any one, or all, of the methodologies described above. The set of instructions 1326 is also shown to reside, completely or at least partially, within the main memory 1310 and/or within the processor 1308. The set of instructions 1326 may further be transmitted or received via the computing network interface device 1330 over the network bus 1314.

Figure 14:
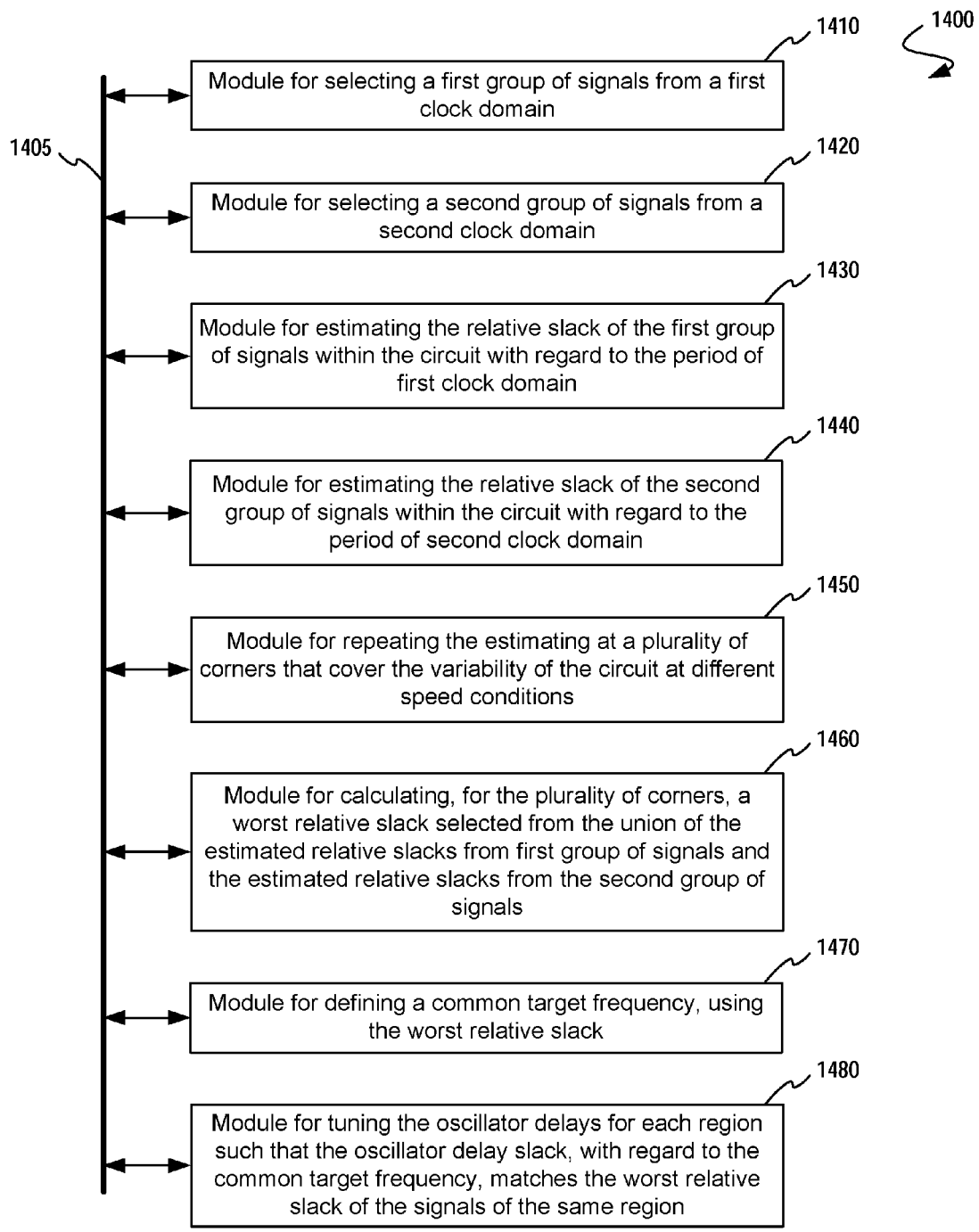
FIG. 14 depicts a block diagram of an EDA system for tuning a plurality of oscillators having a plurality of oscillator delays, according to some embodiments.

FIG. 14 depicts a block diagram of an EDA system (e.g. implemented within computing network 1300) for tuning a plurality of oscillators having a plurality of oscillator delays, the plurality of oscillators placed in different regions of a circuit having multiple clock domains. As an option, the present system 1400 may be implemented in the context of the architecture and functionality of the embodiments described herein. Of course, however, the system 1400 or any operation therein may be carried out in any desired environment. As shown, system 1400 includes a plurality of modules, each connected to a communication link 1405, and any module can communicate with other modules over communication link 1405. The modules of the system can, individually or in combination, perform method steps within system 1400. Any method steps performed within system 1400 may be performed in any order unless as may be specified in the claims. As shown, system 1400 implements a method having multiple clock domains, the system 1400 comprising modules for: selecting a first group of signals from a first clock domain (see module 1410); selecting a second group of signals from a second clock domain (see module 1420); estimating the relative slack of the first group of signals within the circuit with regard to the period of first clock domain (see module 1430); estimating the relative slack of the second group of signals within the circuit with regard to the period of second clock domain (see module 1440); repeating the estimating at a plurality of corners that cover the variability of the circuit at different speed conditions (see module 1450); calculating, for the plurality of corners, a worst relative slack selected from the union of the estimated relative slacks from first group of signals and the estimated relative slacks from the second group of signals (see module 1460); defining a common target frequency, using the worst relative slack (see module 1470); and tuning the oscillator delays for each region such that the oscillator delay slack, with regard to the common target frequency, matches the worst relative slack of the signals of the same region (see module 1480).

It is to be understood that embodiments disclosed herein may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the disclosure has been described with reference to numerous specific details, one of ordinary skill in the art will recognize that embodiments of the claimed material can be embodied in other specific forms without departing from the spirit of the advances. Thus, one of ordinary skill in the art would understand that the advances are not to be limited by the foregoing illustrative details.

What is claimed is:

1. A circuit interconnection structure for synchronizing a network of oscillators within a system placed on a semiconductor substrate comprising:

a plurality of first synchronizing circuits, at least one first synchronizing circuit coupled to a second synchronizing circuit;

wherein a first output of the first synchronizing circuit is coupled to a first input of the second synchronizing circuit through a first tunable delay;

wherein a first output of the second synchronizing circuit is coupled to a first input of the first synchronizing circuit through a second tunable delay;

wherein the at least one first synchronizing circuit comprises an N-input digital signal synchronizing circuit having an input stage capable of accepting a first number of N-input digital signals, and an output stage capable of outputting one or more digital output signals digital output signals;

wherein the one or more digital output signals are asserted only when all of the first number of input signals are asserted; and wherein the one or more digital output signals are deasserted only when all of the first number of input signals are deasserted.

2. The circuit interconnection structure of claim 1, wherein at least one of the tunable delays is tuned to match a critical path of the system.

3. The circuit interconnection structure of claim 1:
wherein the first output of the first synchronizing circuit is an inverting output; and
wherein the first output of the second synchronizing circuit is an inverting output.

4. The circuit interconnection structure of claim 1:
wherein the first input of the second synchronizing circuit is an inverting input; and
wherein the first input of the first synchronizing circuit is an inverting input.

5. The circuit interconnection structure of claim 1:
wherein the plurality of synchronizing circuits comprises more than two synchronizing circuits.

6. A circuit interconnection structure for synchronizing a network of oscillators placed on a semiconductor substrate comprising:
a first synchronizing circuit;
a first neighbor synchronizing circuit;
a second neighbor synchronizing circuit;
a third neighbor synchronizing circuit;
wherein a first output of the first synchronizing circuit is coupled to a first input of the first neighbor synchronizing circuit through a first tunable delay;
wherein a first output of the first neighbor synchronizing circuit is coupled to a first input of the second neighbor synchronizing circuit through a second tunable delay;
wherein a first output of the second neighbor synchronizing circuit is coupled to a first input of the third neighbor synchronizing circuit through a third tunable delay;
wherein a first output of the third neighbor synchronizing circuit is coupled to a first input of the first synchronizing circuit through a fourth tunable delay; and
wherein the first synchronizing circuit comprises:
an N-input digital signal synchronizing circuit having an input stage capable of accepting a first number of N-input digital signals;
an output stage capable of outputting at least one digital output signal wherein the at least one digital output signal is asserted only when all of the first number of input signals are asserted; and wherein the at least one digital output signal is deasserted only when all of the first number of input signals are deasserted.

7. A method for placing a plurality of synchronizing circuits on a plane of a semiconductor substrate comprising:
partitioning the semiconductor substrate into at least one polygonal region;
selecting at least two vertices of the at least one polygonal region;
placing at least two of the plurality of synchronizing circuits at least two vertices of the polygonal region;
configuring at least one of the plurality of synchronizing circuits to accept a first number of input signals; and
configuring an output stage capable of asserting at least one digital output signal when all of the first number of input signals are asserted and deasserting the at least one digital output signal only when all of the first number of input signals are deasserted.

8. The method of claim 7, further comprising interconnecting the plurality of synchronizing circuits into a chain.

9. The method of claim 7, further comprising interconnecting the plurality of synchronizing circuits into a mesh.

10. The method of claim 7, further comprising interconnecting the plurality of synchronizing circuits into a tree.

11. The method of claim 7, further comprising interconnecting the plurality of synchronizing circuits into a star.

12. The method of claim 7, wherein the selecting operation comprises processing CAD data, comprising at least one of, CAD placement data, CAD hierarchy data, CAD constraint data, CAD thermal data, CAD voltage drop data.

13. A method to tune a plurality of synchronizing circuits having a plurality of oscillator delays, the plurality of the synchronizing circuits placed in different regions of a circuit having multiple clock domains, the method comprising:
selecting a first group of signals from a first clock domain;
selecting a second group of signals from a second clock domain;
estimating a first relative slack of the first group of signals within the circuit with regard to a period of the first clock domain;
estimating a second relative slack of the second group of signals within the circuit with regard to a period of the second clock domain;
repeating the estimating at a plurality of corners to cover variability of the circuit at different speed conditions;
calculating, for the plurality of corners, a worst relative slack selected from a union of the first relative slacks from first group of signals and the second relative slacks from the second group of signals;
defining a common target frequency, using the worst relative slack; and
tuning the oscillator delays for each region such that a respective oscillator delay slack, with regard to the common target frequency, matches the worst relative slack of the signals of a corresponding region; and
configuring at least one of the plurality of synchronizing circuits to accept a first number of input signals having an output stage capable of asserting at least one digital output signal when all of the first number of input signals are asserted and deasserting the at least one digital output signal only when all of the first number of input signals are deasserted.

14. The method of claim 13, wherein the plurality of synchronizing circuits comprise interconnecting the plurality of synchronizing circuits into a chain.

15. The method of claim 13, wherein the plurality of synchronizing circuits comprise interconnecting the plurality of synchronizing circuits into a mesh.

16. The method of claim 13, wherein the plurality of synchronizing circuits comprise interconnecting the plurality of synchronizing circuits into a tree.

17. The method of claim 13, wherein the plurality of synchronizing circuits comprise interconnecting the plurality of synchronizing circuits into a star.

\* \* \* \* \*